(12) United States Patent
Pang et al.

(10) Patent No.: US 8,131,581 B1
(45) Date of Patent: Mar. 6, 2012

(54) FORECASTING DEMAND FOR PRODUCTS

(75) Inventors: Hoi-Cheung Pang, Seattle, WA (US);
Sanjay K. Dash, Mercer Island, WA (US); Dilip S. Kumar, Seattle, WA (US); Anil Reddy Musku, Centralia, WA (US); Daniel M. Grossman, Seattle, WA (US); Lekha A. Bhargavi, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1196 days.

(21) Appl. No.: 11/862,062

(22) Filed: Sep. 26, 2007

(51) Int. Cl.
*G06Q 10/00* (2006.01)

(52) U.S. Cl. ............ 705/7.31; 705/7.11; 705/7.12; 705/7.29

(58) Field of Classification Search .......... 705/7.11–7.12, 705/7.29, 7.31–7.33
See application file for complete search history.

(56) References Cited

U.S. PATENT DOCUMENTS

| | | | | |
|---|---|---|---|---|
| 5,299,115 A * | 3/1994 | Fields et al. | ............... | 705/7.22 |
| 6,085,169 A * | 7/2000 | Walker et al. | ............... | 705/4 |
| 6,151,582 A * | 11/2000 | Huang et al. | ............... | 705/7.25 |
| 6,801,908 B1 * | 10/2004 | Fuloria et al. | ............... | 1/1 |
| 6,978,249 B1 * | 12/2005 | Beyer et al. | ............... | 705/7.31 |
| 7,584,116 B2 * | 9/2009 | Kakouros et al. | ............... | 705/7.31 |
| 7,664,671 B2 * | 2/2010 | Shan | ............... | 705/7.11 |
| 2002/0136391 A1 * | 9/2002 | Armstrong | ............... | 379/242 |
| 2003/0120584 A1 * | 6/2003 | Zarefoss et al. | ............... | 705/37 |
| 2003/0212590 A1 * | 11/2003 | Klingler | ............... | 705/10 |
| 2004/0088211 A1 * | 5/2004 | Kakouros et al. | ............... | 705/10 |
| 2004/0148217 A1 * | 7/2004 | Lauring et al. | ............... | 705/10 |
| 2005/0096964 A1 * | 5/2005 | Tsai | ............... | 705/10 |
| 2007/0124259 A1 * | 5/2007 | Sussman et al. | ............... | 705/400 |

OTHER PUBLICATIONS

Lo, K.L.; Wu, Y.K.; , "Risk assessment due to local demand forecast uncertainty in the competitive supply industry," Generation, Transmission and Distribution, IEE Proceedings-, vol. 150, No. 5, pp. 573-581, Sep. 15, 2003.*
Hood, S.J.; Bermon, S.; Barahona, F.; , "Capacity planning under demand uncertainty for semiconductor manufacturing," Semiconductor Manufacturing, IEEE Transactions on , vol. 16, No. 2, pp. 273-280, May 2003.*
Barefield "A Model of Forecast Biasing Behavior", Jul. 1990, The accounting review, pp. 490-501.*

\* cited by examiner

*Primary Examiner* — Romain Jeanty
*Assistant Examiner* — Alan S Miller
(74) *Attorney, Agent, or Firm* — Thomas, Kayden, Horstemeyer & Risley, LLP (57) ABSTRACT

Various embodiments of the present invention are provided to adjust a product demand forecast. In one embodiment, a value is determined of an aggregation of a plurality of product level demand forecasts for a respective plurality of products in a product group at a desired value of a critical ratio. The critical ratio expresses a probability that a forecast will exceed a demand for a given product. A ratio is determined of the aggregation of the product level demand forecasts to a global demand forecast for the product group in the computer system. The ratio is verified as to whether it is congruous with a historical ratio of past aggregate product level demand forecasts to actual product demand.

18 Claims, 4 Drawing Sheets

FORECASTING DEMAND FOR PRODUCTS

BACKGROUND

Merchants such as brick and mortar retailers or online stores often release new products for purchase by the public. Such merchants usually try to store sufficient quantities of new products in inventory so as to be able to supply the consumer demand for such products. However, given that there is typically little or no data that indicates what the demand will be for new products that have yet to be released for purchase by the public, the quantity of product that needs to be stocked in inventory to meet the demand upon initial release can be somewhat speculative. Unfortunately, to ensure adequate inventory to meet consumer demand, merchants often overstock a product that is to be released in the future. This translates into unwanted excess inventory costs and other costs.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
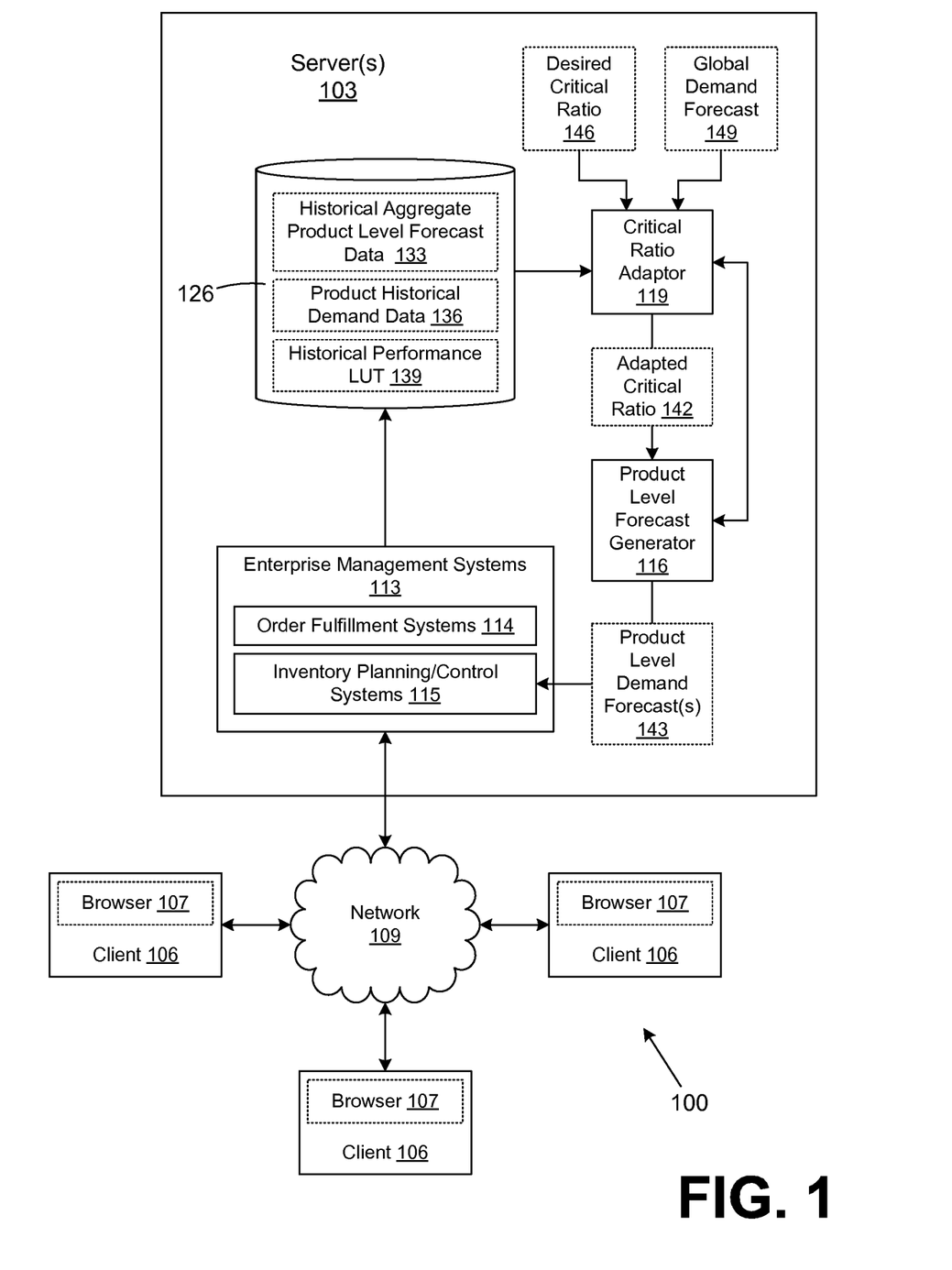
FIG. 1 is a drawing of a network having a plurality of clients and a server that facilitates order fulfillment and inventory planning according to an embodiment of the present invention.

With reference to FIG. 1, shown is a networked environment 100 that includes, for example, at least one server 103 and one or more clients 106. The server 103 may represent multiple servers that may be arranged to work in coordination with each other. Alternatively, such servers 103 may be arranged in some other manner, as can be appreciated. The clients 106 are configured to access information on the server 103. In one embodiment, the clients 106 include a browser 107 to gain browser access to the various applications in the server 103, where the server includes a web application or other appropriate application to provide such browser access. Both the server 103 and the clients 106 are coupled to a network. The network 109 may comprise, for example, any type of network environment such as the internet, intranets, local area networks, wide area networks, wireless networks, or other networks as can be appreciated.

According to various embodiments, the server 103 includes various applications that are executed, for example, to effect order fulfillment for a merchant such as an on-line merchant or a brick and mortar retail outlet. To this end, various enterprise management systems 113 are executed in the server(s) 103 such as order fulfillment systems 114, inventory planning/control systems 115, or other systems as can be appreciated. The order fulfillment systems 114 provide for receiving orders from individuals or organizations that are then fulfilled using fulfillment centers as can be appreciated. In this respect, the order fulfillment systems 114 may leverage web applications to provide browser access to the clients 106 to various product ordering applications, etc.

In addition, the inventory planning/control systems 115 are executed to insure proper levels of inventory of various products are maintained so that consumer demand for such products can be met. There may be many other functions that are executed on the server(s) 103 beyond those discussed herein as can be appreciated. However, such systems are not described herein in detail as they are not particularly pertinent to the various embodiments of the present invention as will be described.

According to various embodiments, other applications that are implemented on the servers 103 include a product level forecast generator 116 and a critical ratio adaptor 119. The server 103 also includes a data store 126 within which data relating to the operation of the online merchant is stored. Such information may include the data that is used to maintain the inventory of products offered by the merchant. In addition, such data includes forecasting data that is used to determine future demand for products offered by the merchant.

To this end, the data stored in the data store 126 includes historical aggregate product level forecast data 133, product historical demand data 136, and a historical performance lookup table 139. In addition, it is understood that other data may be stored in the data store 126.

The historical aggregate product level forecast data 133 involves an aggregation of product level demand forecasts for products that exist within a product group. For example, a product group may comprise a category or type of products such as "books" or "electronics." This historical aggregate product level forecast data 133 involves an aggregation of product level demand forecasts for each of the products in a group that have been generated and stored over time. Such product level demand forecasts may be generated periodically over time to provide guidance as to the levels of inventory of various products that should be maintained in order to meet customer demand. The historical aggregate product level forecast data 133 involves an aggregation of such product level demand forecasts for all products within a product group.

The product historical demand data 136 involves the data associated with actual sales of products. Specifically, over time as products are sold, the quantities of such products sold is stored. Such data may be stored in the data store 126 as part of an inventory control function as can be appreciated.

The historical performance lookup table 139 expresses a value of an historical ratio as a function of a critical ratio. The critical ratio is a value that expresses the probability that a given forecast will exceed a demand for a given product. The historical ratio comprises an aggregate of the product level demand forecasts over actual product demand for a pre-defined period of time. Further description of the historical performance lookup table 139 is described in particularity with respect to later figures.

In addition, there are various inputs to the product level forecast adjuster 119 in order to generate a product level demand forecast 143 for respective products that is employed by the inventory planning/control systems 115 to maintain optimum quantities of products in inventory.

The product level forecast generator 116 is configured to generate a product level demand forecast 143 that is applied to the inventory planning/control systems 115. The product level forecast generator 116 may use various approaches to generate the product level demand forecasts 143. For example, the initial product level demand forecasts 143 may be generated using such techniques as time series modeling examining demand for the product, historical price changes, and other information as can be appreciated.

According to one embodiment of the present invention, the product level demand forecast 143 is generated at an adapted critical ratio 142 that is determined by the critical ratio adaptor 119. Inputs to the critical ratio adaptor include a desired critical ratio 146 determined by inventory planners and is used to calculate the product level demand forecast 143. By specifying the desired critical ratio 146 in this manner, inventory planners indicate the desired probability that a given product level demand forecast 143 will exceed a demand for a given product. Thus, the critical ratio comprises a value between 0 and 1. If planners want to ensure that demand will not exceed inventory, for example, then a relatively high desired critical ratio may be specified such as "0.9" or other value. Lower values for the critical ratio may be around 0.6 or other value.

Another input into the critical ratio adaptor 119 is a global demand forecast 149. The global demand forecast 149 is a forecast of consumer demand for a given group of products. For example, the global demand forecast 149 may involve determining consumer demand for specific products such as books or electronics. Also, the global demand forecast 149 may involve specific demand for subsets of books such as "mysteries" or other subsets as can be appreciated. The global demand forecast 149 is a "top down" forecast in that it is generated with the entire grouping of products in mind. In this respect, various approaches may be employed to generate such a forecast including, for example, techniques that are similar to those used to generate the product level demand forecasts 143.

Next, a general description of the operation of the various components within the server 103 are described. To begin, the desired critical ratio 146 and the global demand forecast 149 are provided to the critical ratio adapter 119. The critical ratio adapter 119 employs the historical performance lookup table 139 in order to determine whether the desired critical ratio 146 needs to be changed or adapted for the generation of product level demand forecasts 143 that comport with historical data based upon the current global demand forecast 149. Ultimately, the critical ratio adapter 119 generates the adapted critical ratio 142.

The adapted critical ratio 142 may be the desired critical ratio 146 if the desired critical ratio 146 comports with historical data as determined using the current global demand forecast 149 as will be described. Alternatively, the adapted critical ratio 142 may be an adjusted value that differs from the desired critical ratio 146 as will be described.

Once the adapted critical ratio 142 is determined, then it is provided to the product level forecast generator 116. The product level forecast generator 116 may then employ the adapted critical ratio 142 to generate product level demand forecasts 143 for all of the products within a given product group. The product level demand forecasts 143 are then provided to an inventory planning/control system 115 that uses the product level demand forecasts 143 to determine the various quantities of products to be stocked in inventory.

Figure 2:
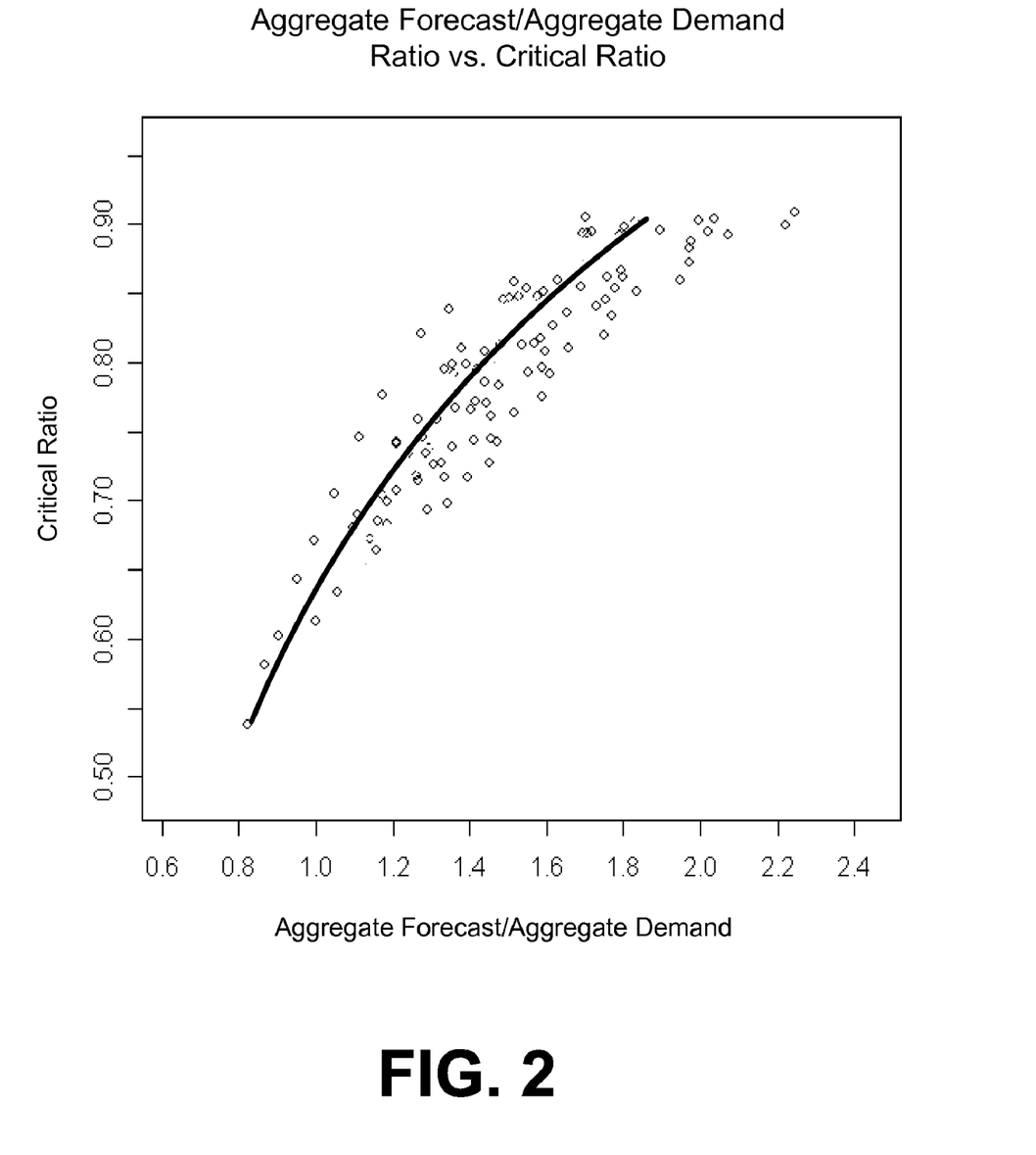
FIG. 2 is a curve that depicts a historical ratio of an aggregate of product level demand forecasts to an aggregate demand as a function of a critical ratio that is employed to generate a demand forecast in the server of FIG. 1 according to an embodiment of the present invention.

Referring next to FIG. 2, shown is a graph that expresses a ratio of historical aggregate product level demand forecasts over aggregate demand for products as a function of critical ratio. A merchant may obtain and store product level demand forecasts for all of the products that they sell to consumers over time. Since consumer demand for respective products can change as time progresses, a merchant might endeavor to generate product level forecasts periodically over time to gauge consumer demand for products, thereby allowing a merchant to maintain proper levels of inventory of such products. The maintenance of inventory as such is expensive. Therefore, it is incumbent upon merchants to ensure that they can minimize the amount of inventory maintained, while at the same time meeting consumer demands for products.

Consequently, product level forecasts for the respective products offered by a merchant can be generated periodically. In one example, product level demand forecasts 143 may be generated for the respective products of a given merchant every three weeks or at some other time interval. For that matter, the forecasts may be generated every day to project consumer demand three weeks into the future.

For a given time period, the product level demand forecasts 143 associated with products in a product group may be added together and stored as a historical aggregate product level demand forecast 133 (FIG. 1). According to one embodiment, the product level demand forecasts 143 are generated for each product in the product group at a range of values for the critical ratio. Thus, for each time period, a historical aggregate product level demand forecast 133 is generated at several different values for the critical ratio. As set forth above, the critical ratio expresses the probability that a given forecast will exceed a demand for the given product within the time period.

In addition, as products are sold, the quantities of products sold may be stored as the product historical demand data 136 for the same time period(s). Thus, to generate the chart of FIG. 2, the product level demand forecasts 143 generated at a respective critical ratio for products within a given product group as set forth above are aggregated to obtain an aggregate product level demand forecast. Also, the aggregate of the demand for each individual product within the respective product group is calculated based upon the product historical demand data 136 for the same time period. The ratio is then calculated for a given value of the critical ratio as:

$$\text{Ratio} = \frac{\text{Aggregate Product Level Demand Forecast}}{\text{Aggregate Demand}}.$$

Thus, the values of the ratio above are plotted in the chart of FIG. 2 as a function of the critical ratio. The plotted points may be averaged into a curve from which the historical performance lookup table 139 is generated. Thus, according to one embodiment, the historical performance lookup table 139 provides a ratio of aggregate product level demand forecasts over aggregate demand for a given time period as a function of the critical ratio. Hereafter, this ratio is termed the "aggregate forecast/demand ratio."

It has been determined that over time the aggregate forecast/demand ratio should not change significantly over time for a given critical ratio. Thus, when making forecasts of customer demand for a given product in the future, according to the various embodiments of the present invention, the aggregate forecast/demand ratio and the global demand forecast 149 are used to adjust the critical ratio that is employed to calculate product level demand forecasts 143. This is done to increase the possibility that the inventory of individual products is maintained at optimal levels.

Figure 3:
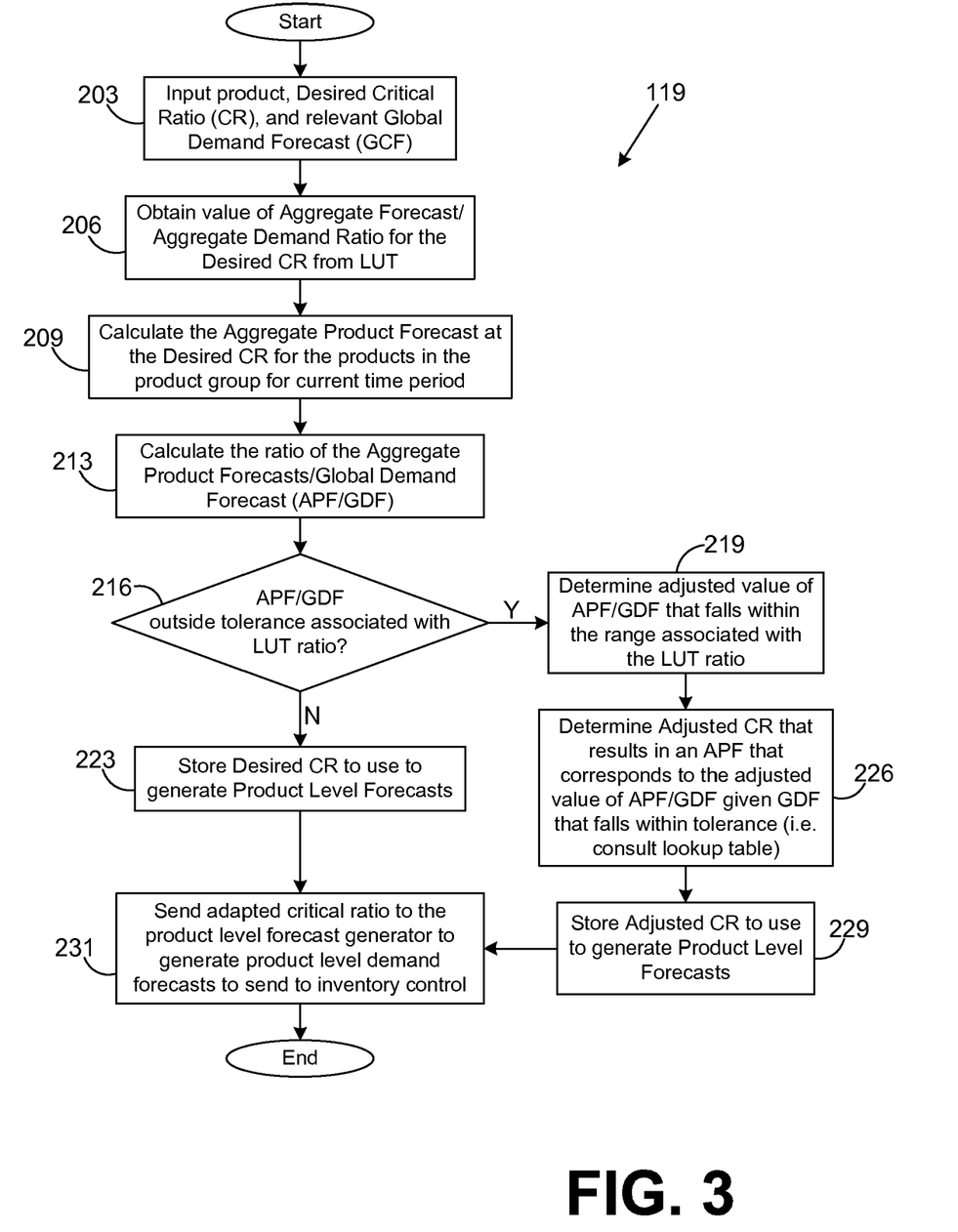
FIG. 3 is a flow chart of a product level forecast adjustor implemented in the server of FIG. 1 in order to adjust product level forecasts according to an embodiment of the present invention.

With reference to FIG. 3, shown is a flow chart that provides one example of the operation of the critical ratio adaptor 119 according to an embodiment of the present invention. Alternatively, the flow chart of FIG. 6 may be viewed as depicting steps of an example of a method implemented in the server 103 to adapt a desired value of the critical ratio based upon the historical aggregate forecast/demand ratio and the global demand forecast 149. The functionality of the critical ratio adaptor 119 as depicted by the example flow chart of FIG. 3 may be implemented, for example, in an object oriented design or in some other programming architecture. Assuming the functionality is implemented in an object oriented design, then each block represents functionality that may be implemented in one or more methods that are encapsulated in one or more objects. The critical ratio adaptor 119 may be implemented using any one of a number of programming languages such as, for example, C, C++, JAVA, or other programming languages.

Beginning with box 203, the critical ratio adapter 119 inputs a respective product group comprising a predefined list of products, a desired critical ratio, and a relevant global demand forecast (GCF) for a respective product group as set forth above. Such information may be entered manually or stored in the data store 126 by virtue of an automated process and made available to the critical ratio adaptor 119.

Thereafter, in box 206, the critical ratio adapter 119 obtains a value from the lookup table for the value of the aggregate forecast/demand ratio for the desired critical ratio 146 (FIG. 1) input in box 203. To give a specific example, assume that a desired critical ratio 146 for a particular product group is equal to 0.9. This results in an aggregate forecast/demand ratio of approximately 1.8 as determined from the lookup table generated based upon the graph of FIG. 2.

Thereafter, in box 209, an aggregate product level demand forecast is generated at the desired critical ratio 146 for the products in the respective product group for the predefined future time period. For example, the aggregate of the product level demand forecasts 143 may be calculated at the desired critical ratio for products in a respective product group that are to be sold in a time period extending into the future such as, for example, three weeks or other time period. The critical ratio adaptor 119 may interface with the product level forecast generator to obtain the product level demand forecasts 143.

Next, in box 213, the critical ratio adapter 119 calculates a ratio of the aggregate product level demand forecast (or "aggregate product forecast (APF)") over the global demand forecast (GDF) 149 which is the ratio (APF/GDF). If it is assumed that the global demand forecast 149 is accurate, then it follows that the global demand forecast 149 may be used as a parallel to the aggregate demand history used to calculate the aggregate forecast/demand ratio as described above.

If it is further assumed that the aggregate product level demand forecast is accurate, then the value of the ratio of the aggregate product level demand forecast over the global demand forecast 149 should be approximately equal the historical aggregate forecast/demand ratio for the respective product group. Underlying the above assumptions is the fact that the historical aggregate forecast/demand ratio for a given product group will not fluctuate significantly over time.

Next, in box 216, it is determined whether the ratio calculated in box 213 falls within a tolerance associated with the respective aggregate forecast/demand ratio obtained from the lookup table 139. This reflects the fact that the calculated ratio of box 213 may not always be equal to the aggregate forecast/demand ratio identified from the lookup table 139. For that matter, the aggregate forecast/demand ratio can vary over time, where the variation is typically not substantial.

However, according to various embodiments, it is desirable that the ultimate value calculated in box 213 for the APF/GDF ratio should approach the aggregate forecast/demand ratio obtained from the lookup table in box 206. This is because this value is based in historical data that has been accumulated over time and should not vary significantly relative to the product level demand forecasts generated for the future. Assuming that the APF/GCF ratio is outside of the tolerance associated with the aggregate forecast/demand ratio obtained from the lookup table 139, then the critical ratio adapter 119 proceeds to box 219.

On the other hand, if the APF/GDF ratio is within the tolerance associated with the aggregate forecast/demand ratio obtained from the lookup table 139, then the critical ratio adapter 119 proceeds to box 223. Note that the tolerance associated with the values of the aggregate forecast/demand ratio from the lookup table 139 may be the same for all such values obtained therefrom at respective critical ratios. Alternatively, a separate lookup table may be generated that provides a tolerance for corresponding values of the aggregate forecast/demand ratio obtained from the lookup table 139 at respective critical ratios.

In box 219, the critical ratio adapter 119 determines an adjusted value for the APF/GDF ratio that falls within the tolerance associated with the ratio obtained from the lookup table. According to one embodiment, this may be the highest or lowest value based on the tolerance that is closest to the value calculated in box 213.

Thereafter, in box 226, an adjusted value for the critical ratio is determined at which the calculation of the APF value results in an adjusted value for the APF/GDF ratio that is congruous with the value of the aggregate forecast/demand ratio obtained from the lookup table 139. The value of this ratio is congruous with the aggregate forecast/demand ratio obtained from the lookup table 139, for example, if the value falls within the tolerance associated with the aggregate forecast/demand ratio or is actually equal to the value of the aggregate forecast/demand ratio.

Recall in the example above, the aggregate forecast/demand ratio was identified in box 206 as 1.8 for a desired critical ratio of 0.9. Further assume a tolerance of +/−0.1 is associated with the aggregate forecast/demand ratio of 1.8 obtained from the lookup table 139. Also assume that the value of the APF/GDF ratio is equal to 2.2. Given that the aggregate forecast/demand ratio is 1.8 with a tolerance of +/−0.1, then it is clear that the APF/GDF ratio of 2.2 calculated in box 213 is outside of the tolerance. As such, an adjusted value for the critical ratio is determined such that the APF/GDF ratio is equal to 1.9, which is at the upper limit of the tolerance associated with the aggregate forecast/demand ratio of 1.8. This may be done by consulting a lookup table that correlates critical ratio values to the value of the APF/GDF ratio. Also, it may be done using an iterative process, or other approach. Once the adjusted value for the critical ratio is determined in box 226, then the critical ratio adapter 119 proceeds to box 229. In box 229 the adjusted value for the critical ratio is stored for further use in generating product level demand forecasts 143.

Thus, we see in the above example, the value for the APF/GDF ratio is too high given the aggregate forecast/demand ratio as set forth in the lookup table 139. Thus, we are able to use the historical data represented by the aggregate forecast/demand ratios in the lookup table 139 in addition to the global demand forecast 149 associated with a group of products to ensure that the ultimate product level forecasts 143 for products in the product group are in line with historical data based upon the more accurate global demand forecasts 149. Once the adjusted value of the critical ratio is stored in box 229, then the critical ratio adapter 119 proceeds to box 231.

With reference back to box 223, assuming that the APF/GDF ratio calculated in box 213 falls within the tolerance of the respective aggregate forecast/demand ratio looked up in box 206, then the desired critical ratio 146 is the proper critical ratio to be used to generate product level demand forecasts 143. As such, the "adapted critical ratio 142" is the same as the desired critical ratio 146. This value is saved for use in generating the product level demand forecasts 143 for respective products in the given product group. Thereafter, the critical ratio adapter 119 proceeds to box 231 as shown.

In box 231, the adapted critical ratio 142 is sent to the product level forecast generator 116 in order to generate product level demand forecasts 143 that are sent to the inventory control system 113 to determine the levels of products that should be stored in inventory to meet customer demand. In this sense, the "adapted critical ratio" may be equal to the desired critical ratio or an adjusted critical ratio depending upon whether the APF/GDF ratio calculated in box 213 falls within a given tolerance of the aggregate forecast/demand ratio obtained from the lookup table as set forth in box 206.

Figure 4:
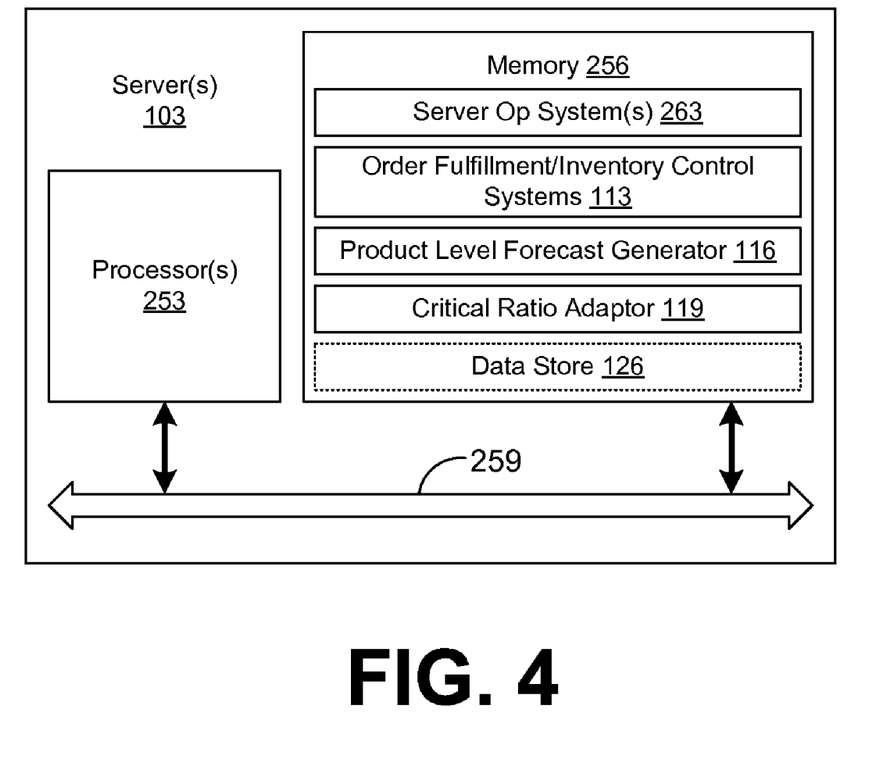
FIG. 4 is a schematic block diagram of one embodiment of the server of FIG. 1 according to an embodiment of the present invention.

With reference to FIG. 4, shown is one example of a server 103 that comprises a computer server or equivalent device according to an embodiment of the present invention. The server 103 may include one or more processor circuits having a processor 253 and a memory 256, both of which are coupled to a local interface 259. In this respect, the local interface 259 may comprise, for example, a data bus with an accompanying control/address bus as can be appreciated.

Stored on the memory 256 and executable by the processor 253 are various components such as a server operating system 263, the order fulfillment/inventory control systems 113, the product level forecast generator 116, and the critical ratio adaptor 119. Also, the data store 126 may be located in the memory 256 as can be appreciated. In addition, it is understood that many other components may be stored in the memory 256 and executable by the processors 253. Also, such components may reside in a memory that is external from the server 103 as can be appreciated.

As set forth above, a number of components are stored in the memory 256 and are executable by the processor 253. In this respect, the term "executable" refers to a program file that is in a form that can ultimately be run by the processor 253. Examples of executable programs may be, for example, a compiled program that can be translated into machine code in a format that can be loaded into a random access portion of the memory 256 and run by the processor 253, or source code that may be expressed in proper format such as object code that is capable of being loaded into a random access portion of the memory 256 and executed by the processor 253. An executable program may be stored in any portion or component of the memory 256 including, for example, random access memory, read-only memory, a hard drive, compact disk (CD), floppy disk, or other memory components.

The memory 256 is defined herein as both volatile and nonvolatile memory and data storage components. Volatile components are those that do not retain data values upon loss of power. Nonvolatile components are those that retain data upon a loss of power. Thus, the memory 256 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 253 may represent multiple processors and the memory 256 may represent multiple memories that operate in parallel. In such a case, the local interface 259 may be an appropriate network that facilitates communication between any two of the multiple processors, between any processor and any one of the memories, or between any two of the memories, etc. The processor 253 may be of electrical, optical, or of some other construction as can be appreciated by those with ordinary skill in the art.

The server operating system 263 is executed to control the allocation and usage of hardware resources such as the memory and processing time in the server 103. In this manner, the server operating system 263 serves as the foundation on which applications depend as is generally known by those with ordinary skill in the art.

Although the functionality of various components such as the critical ratio adaptor 119 and the product level forecast generator 116 are described above with respect to FIGS. 1-3 as being embodied in software or code executed by general purpose hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 3 shows the functionality and operation of an implementation of the critical ratio adaptor 119. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the functionality of the critical ratio adaptor 119 is expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system. In the context of the present invention, a "computer-readable medium" can be any medium that can contain, store, or maintain the network page for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for forecasting demand for a product, comprising:
   determining in a computer system a value of an aggregation of a plurality of product level demand forecasts for a respective plurality of products in a product group at a desired value of a critical ratio, the critical ratio expressing a probability that a forecast will exceed a demand for a given product;
   determining a forecast ratio of the aggregation of the product level demand forecasts to a global demand forecast for the product group in the computer system; and
   verifying that the forecast ratio is congruous with a historical ratio of past aggregate product level demand forecasts to actual product demand in the computer system.

2. The method of claim 1, where the forecast ratio is congruous with the historical ratio if the forecast ratio falls within a predefined tolerance of the historical ratio.

3. The method of claim 1, where the forecast ratio is congruous with the historical ratio if the forecast ratio is equal to the historical ratio.

4. The method of claim 1, further comprising the step of determining an adjusted value of the critical ratio in the computer system at which a calculation of the aggregation of the plurality of product level demand forecasts results in an adjusted value for the forecast ratio that is congruous with the historical ratio if the forecast ratio is not verified to be congruous with the historical ratio.

5. The method of claim 4, further comprising the step of controlling a quantity of at least one product in an inventory based upon a product level demand forecast determined at the desired value of the critical ratio if the forecast ratio is verified to be congruous with the historical ratio.

6. The method of claim 4, further comprising the step of controlling a quantity of at least one product in an inventory based upon a product level demand forecast determined at the adjusted value of the critical ratio if the forecast ratio is not verified to be congruous with the historical ratio.

7. The method of claim 1, further comprising the step of maintaining a lookup table in a memory that expresses the historical ratio as a function of the critical ratio.

8. A system for forecasting demand for a product, comprising:
   a processor circuit having a processor and a memory;
   forecasting logic stored in the memory and executable by the processor, the forecasting logic comprising:
      logic that determines a value of an aggregation of a plurality of product level demand forecasts for a respective plurality of products in a product group at a desired value of a critical ratio, the critical ratio expressing a probability that a forecast will exceed a demand for a given product;
      logic that determines a forecast ratio of the aggregation of the product level demand forecasts to a global demand forecast for the product group; and
      logic that verifies that the forecast ratio is congruous with a historical ratio of past aggregate product level demand forecasts to actual product demand.

9. The system of claim 8, where the forecast ratio is congruous with the historical ratio if the forecast ratio falls within a predefined tolerance of the historical ratio.

10. The system of claim 8, where the forecast ratio is congruous with the historical ratio if the forecast ratio is equal to the historical ratio.

11. The system of claim 8, wherein the forecasting logic further comprises logic that determines an adjusted value of the critical ratio at which a calculation of the aggregation of the plurality of product level demand forecasts results in an adjusted value for the forecast ratio that is congruous with the historical ratio if the forecast ratio is not verified to be congruous with the historical ratio.

12. The system of claim 11, wherein the forecasting logic further comprises logic that provides a product level demand forecast to an inventory control system, where the inventory control system is configured to control a quantity of at least one product in an inventory based upon the product level demand forecast, the product level demand forecast being determined at the desired value of the critical ratio if the forecast ratio is verified to be congruous with the historical ratio.

13. The system of claim 11, wherein the forecasting logic further comprises logic that provides a product level demand forecast to an inventory control system, where the inventory control system is configured to control a quantity of at least one product in an inventory based upon the product level demand forecast, the product level demand forecast being determined at the adjusted value of the critical ratio if the forecast ratio is not verified to be congruous with the historical ratio.

14. The system of claim 8, further comprising a lookup table stored in the memory that expresses the historical ratio as a function of the critical ratio.

15. A system for forecasting demand for a product, comprising:
- means for determining a value of an aggregation of a plurality of product level demand forecasts for a respective plurality of products in a product group at a desired value of a critical ratio, the critical ratio expressing a probability that a forecast will exceed a demand for a given product;
- means for determining a forecast ratio of the aggregation of the product level demand forecasts to a global demand forecast for the product group; and
- means for verifying that the forecast ratio is congruous with a historical ratio of past aggregate product level demand forecasts to actual product demand.

16. The system of claim 15, where the forecast ratio is congruous with the historical ratio if the forecast ratio falls within a predefined tolerance of the historical ratio.

17. The system of claim 15, further comprising means for determining an adjusted value of the critical ratio at which a calculation of the aggregation of the plurality of product level demand forecasts results in an adjusted value for the forecast ratio that is congruous with the historical ratio if the forecast ratio is not verified to be congruous with the historical ratio.

18. The system of claim 15, further comprising a lookup table stored in a memory that expresses the historical ratio as a function of the critical ratio.

* * * * *